US007707150B2

(12) United States Patent
Sundararajan et al.

(10) Patent No.: US 7,707,150 B2
(45) Date of Patent: Apr. 27, 2010

(54) AUTOMATIC EXCHANGE OF INFORMATION IN AN AD-HOC COMPUTING ENVIRONMENT

(75) Inventors: Muralidharan Sundararajan, Portland, OR (US); John Light, Beaverton, OR (US); Trevor A. Pering, Seattle, WA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 10/794,436

(22) Filed: Mar. 5, 2004

(65) Prior Publication Data

US 2005/0198035 A1    Sep. 8, 2005

(51) Int. Cl.
*G06F 17/30* (2006.01)
(52) U.S. Cl. .......................................... 707/10
(58) Field of Classification Search ............... 455/556.2
See application file for complete search history.

(56) References Cited

U.S. PATENT DOCUMENTS

| 6,308,201 | B1* | 10/2001 | Pivowar et al. ............ 709/214 |
| 6,430,601 | B1* | 8/2002 | Eldridge et al. ........... 709/206 |
| 6,587,835 | B1* | 7/2003 | Treyz et al. .................. 705/14 |
| 6,785,542 | B1* | 8/2004 | Blight et al. ............ 455/426.1 |
| 6,879,997 | B1* | 4/2005 | Ketola et al. ............... 709/208 |
| 7,149,511 | B1* | 12/2006 | Bachner et al. ............ 455/419 |
| 2001/0014870 | A1* | 8/2001 | Saito et al. .................. 705/14 |
| 2001/0051981 | A1* | 12/2001 | Davison et al. ............ 709/203 |
| 2002/0111154 | A1* | 8/2002 | Eldering et al. ............ 455/414 |
| 2002/0111172 | A1* | 8/2002 | DeWolf et al. ............. 455/456 |
| 2002/0156860 | A1* | 10/2002 | Finke et al. ................ 709/208 |
| 2003/0032435 | A1* | 2/2003 | Asada et al. ............... 455/456 |
| 2003/0069877 | A1* | 4/2003 | Grefenstette et al. .......... 707/2 |
| 2004/0205453 | A1* | 10/2004 | Mortensen .................. 715/500 |
| 2004/0219928 | A1* | 11/2004 | Deeds ..................... 455/456.1 |

OTHER PUBLICATIONS

Microsoft Press, Comupter Dictionary, 3rd Edition, p. 305, 1997.*
Want et al., "The Personal Server: Changing the Way We Think About Ubiquitous Computing," UBICOMP 2002, 9 pages.
Anderson, "Why Cryptosystems Fail," Communications of the ACM, Nov. 1994, 13 pages.
Banavar et al., "Challenges: An Application Model for Pervasive Computing," Proceedings of ACM MOBICOM, Aug. 2000, 9 pages.
Hill et al., "System Architecture Directions for Networked Sensors," Ninth International Conference on Architectural Support for Programming Languages and Operating Systems, Nov. 2000, 12 pgs.

(Continued)

*Primary Examiner*—Cheyne D Ly
(74) *Attorney, Agent, or Firm*—Blakely, Sokoloff, Taylor & Zafman LLP (57) ABSTRACT

Automatic exchange of information in an ad-hoc computing environment is disclosed. According to one embodiment of the invention, a collection agent module facilitates a search for a first device to connect to via a wireless network. The collection agent queries for and receives a first document from the first device based on metadata associated with the first document and the collection agent automatically forwards the received first document to a second device connected to the wireless network upon receiving the first document from the first device. The collection agent also automatically sends a second document to the first device upon the first device connecting to the wireless network.

12 Claims, 4 Drawing Sheets

OTHER PUBLICATIONS

IEEE 802.11b, WiFi Standard, http://grouper.ieee.org/groups/802/11/index.html, Apr. 2002, 4 pages.

Kozuch et al., "Internet Suspend/Resume," Proceedings of the Workshop on Mobile Computing Systems and Applications, NY, Jun. 20-21, 2002, 15 pages.

Li et al., "Capturing and Indexing Computer-based Activities With Virtual Network Computing," Proceedings of the 2000 ACM Symposium on Applied Computing, Italy, vol. 2, Mar. 2000, 3 pages.

Mayo, "Reprint of the Factoid Web Page," Compaq WRL Technical Report, Jul. 2001, 6 pages.

Staudter, "The Core of Computing," IBM Think Research, www.research.ibm.com/thinkresearch, Feb. 7, 2002, 5 pages.

Noble et al., "Agile Applications-Aware Adaptation for Mobility," Proceedings of the 16th ACM Symposium on Operating System Principles, Oct. 1997, 12 pages.

IEEE 802.15, "Working Group for Wireless Personal Area Networks," Presentation at In-Stat Forum, Phoenix, Arizona, May 2001, 14 pages.

Pirhonen et al., "Gestural and Audio Metaphors as a Means of Control for Mobile Devices," Proceedings of the SIGCHI conference on Human Factors in Computing Systems, Apr. 2002, 8 pgs.

Pering et al., "Voltage Scheduling in the IpARM Microprocessor System," ISLPED, Jul. 2000, pp. 96-101.

Pering et al., "Photographic Authentication Through Untrusted Terminals," Pervasive Computing, Published by the IEEE CS and IEEE Communication Society, 2003, pp. 30-36.

Ross et al, "A Composable Framework for Secure Multi-Modal Access to Internet Services from Post-PC Devices," Proceedings of the 3rd IEEE WMCSA, Dec. 2000, 12 pages.

Satyanarayanan, "The Evolution of Coda," ACM Transaction on Computer Systems, vol. 20, No. 2, May 2002, pp. 85-124.

Schilit et al., "m-Links: An Infrastructure for Very Small Internet Devices," Proceedings of the 7th Annual International Conference on Mobile Computing and Networking, Jul. 2001, 10 pages.

Ponnekanti et al., "ICrafter: A Service Framework for Ubiquitous Computing Environments," Proceedings of UBICOMP 2001, pp. 56-76.

Starner, "The Challenges of Wearable Computing: Part 1," IEEE Micro, Jul. 2001, pp. 44-52.

Starner, "The Challenges of Wearable Computing: Part 2," IEEE Micro, Jul. 2001, pp. 54-67.

Singh et al., "Power-aware Routing in Mobile Ad Hoc Networks," The 4th Annual ACM/IEEE International Conference on Mobile Computing and Networking, Oct. 1998, 10 pages.

Swierk et al., "The Roma Personal Metadata Service," to appear in Mobile Networks and Applications, vol. 7, No. 5, Sep./Oct. 2002, 10 pages.

Terry et al., "Managing Update Conflicts in Bayou, a Weakly Connected Replicated Storage System," Proceedings of 15th Symposium on Operating Systems Principles, Dec. 1995, 12 pages.

Toigo, "Avoiding a Data Crunch," Scientific American, May 2000, vol. 282, No. 5, pp. 58-74.

Truman et al., "The InfoPad Multimedia Terminal: A Portable Device for Wireless Information Access," IEEE Transactions on Computers, Oct. 1998, vol. 47, No. 10, pp. 1073-1087.

UPnP, "Understanding Universal Plug and Play," Microsoft white paper available at http://www.upnp.org, Jun. 2000, pp. 1-39.

Want et al., "The Active Badge Location System," ACM Transactions on Office Information Systems, vol. 10, No. 1, Jan. 1992, pp. 91-102.

Want et al., "An Overview of the ParcTab Ubiquitous Computing Experiment," IEEE Personal Communications, Dec. 1995, vol. 2, No. 6, pp. 28-43.

Want et al., "Disappearing Hardware," IEEE Pervasive Computing, vol. 1, Issue 1, Apr. 2002, pp. 36-47.

Weiser, "The Computer for the 21st Century," Scientific American, Sep. 1991, vol. 265, No. 3, pp. 94-104.

Hazas et al., "2003 Workshop on Location-Aware Computing," Part of UBICOMP 2003, Proceedings of the 2003 Workshop on Location-Aware Computing, pp. 1-31.

* cited by examiner

AUTOMATIC EXCHANGE OF INFORMATION IN AN AD-HOC COMPUTING ENVIRONMENT

TECHNICAL FIELD

Embodiments of the invention relate to the field of mobile computing; and more specifically, to the automatic exchange of information in an ad-hoc computing environment.

BACKGROUND

The exchange of information is typically performed over a wired communications connection. However, smaller portable mobile devices have been used to exchange information over a wireless communication connection. For example, a personal digital assistant (PDA) typically includes an infrared communications port to allow a user to exchange information with another PDA. However, this process obviously becomes laborious and time-consuming if the user must exchange the same data with multiple PDA devices. In addition, the user must physically manipulate the device using small, difficult to use user interfaces. Another method of exchanging information may be to use electronic mail (e-mail) to share the desired information with multiple mobile devices. However, exchanging information via e-mail is awkward and time-consuming using small mobile devices such as PDAs and mobile phones because of the small size of the screen displays and the awkward input mechanisms (e.g. mobile phone touch-pads, miniature keyboards, PDA Graffiti, etc.) especially given the user must actively send the e-mail message after inserting the list of recipients. Furthermore, these methods of exchanging information do not assist the recipient of the information to organize, categorize, and store the received disparate information.

Thus, a better method and system is needed for the automatic exchange of information in an ad-hoc computing network.

BRIEF DESCRIPTION OF THE DRAWINGS

The invention may best be understood by referring to the following description and accompanying drawings that are used to illustrate embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Automatic exchange of information in an ad-hoc computing network environment is described. According to one embodiment of the invention, a mobile device automatically exchanges information with a collection server without human intervention, by periodically querying the environment to detect nearby devices. Upon discovering a particular device, the collection agent queries the mobile device to determine which information, if any, it should transfer to or from its local data store. The information exchanged might be user documents (e.g., spreadsheet documents, word processing documents, digital audio files, digital image files, digital video files, field data files, etc) for use in a user application (e.g., a spreadsheet program, word processing program, digital audio player, digital image viewer, digital video program, field data program, etc.), as will be described.

As will be described, the mobile device platform is comprised of, but is not limited to, processing, communication, and storage subsystems, which are combined together to form a compact, low-power mobile device. In one embodiment, such a mobile device is a personal server mobile device that has little or no user interface facilities (e.g., all user interactions occurring over a wireless link).

The personal server can include, but is not limited to, a file server, a web server, a media server, or any other facilities that a modern server might have to fundamentally provide data services over a wireless link to another device nearby. The personal server may be continually powered-on to proactively interact with the environment around it, as will be described. The following will describe embodiments of a process to exchange information using a personal server device. However, it should be understood that the invention is not limited to be used only with a personal server mobile device. Rather, in alternative embodiments, the following services might be embedded in or paired with other computing devices that are well known to those of ordinary skill in the art including portable personal computers, mobile phones, PDAs, wearable systems, etc. Furthermore, it should be understood that the term "personal server" should not be interpreted to mean that the personal server device only provides the services of a server device in a client-server network. Rather, the personal server may also perform client services, as will be described, as well as services of a peer-to-peer device.

Figure 1:
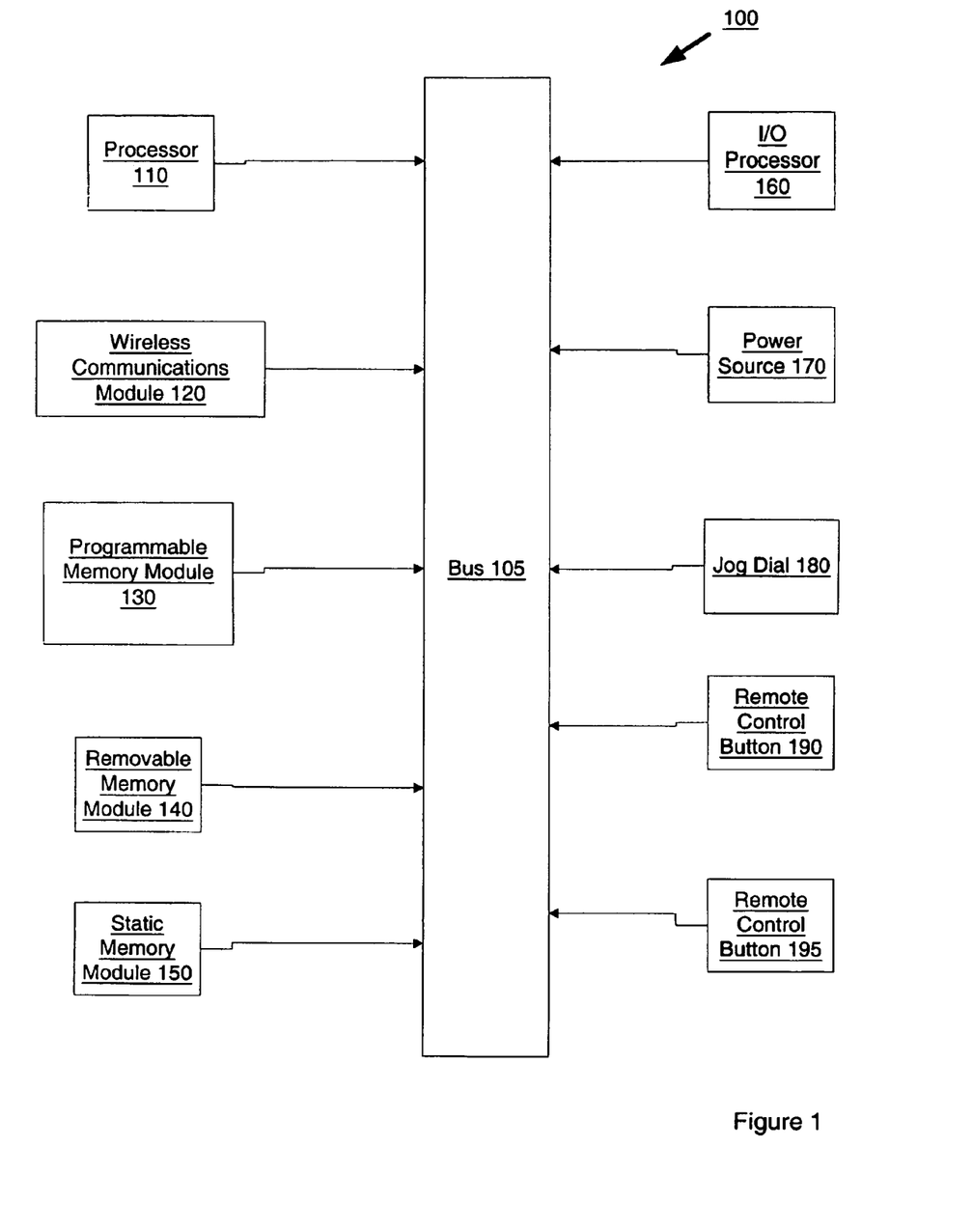
FIG. 1 illustrates one embodiment of a personal server.

FIG. 1 illustrates one embodiment of a personal server 100. The personal server 100 includes, but is not limited to, a processor 110, a wireless communications module 120 (e.g., an out-of-band radio, a Bluetooth Radio by Ericsson Inc of Stockholm Sweden, etc.), a programmable memory module 130 (e.g., Flash memory, etc), a removable memory module slot 140 (e.g., a removable compact flash slot for user-specific storage), a static memory module 150 (e.g., various forms of Random Access Memory (RAM)), an I/O processor 160, a power source 170 (e.g., a 920 mAhr Li-ion cell), a jog dial 180, a remote control button 190, and a remote control button 195 each connected via a bus 105.

In one embodiment, the wireless communications module 120 provides for device discovery and enables connection to a wide variety of other consumer electronic devices, such as printers, mobile phones, PDAs, user interface/display monitors, audio headsets, etc. The personal server 100 may have a Bluetooth software stack integrated with a standard Linux Operating System (OS) release that has been augmented with well-known TCP/IP functionality.

Figure 2:
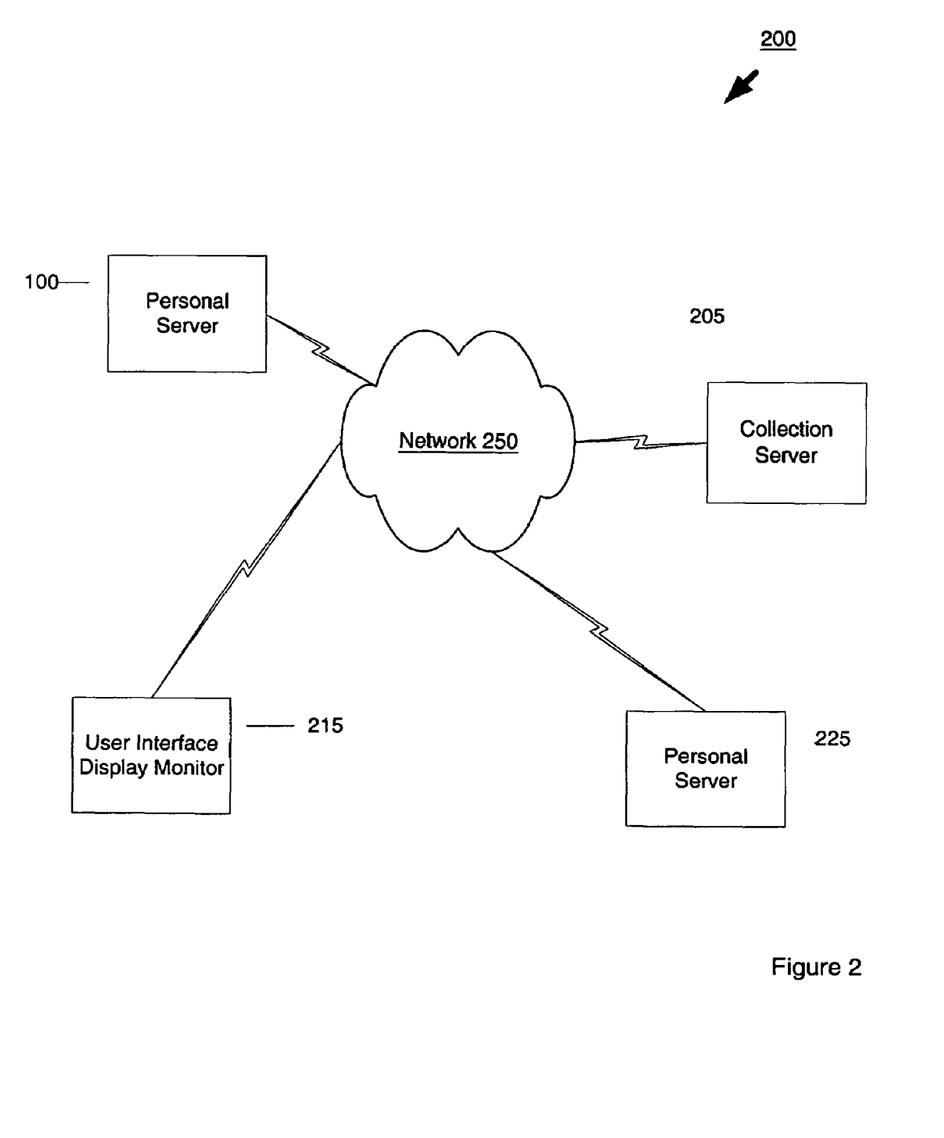
FIG. 2 illustrates one embodiment of a network environment suitable for the personal server.

FIG. 2 illustrates one embodiment of a network environment 200 suitable for the personal server 100. The personal server 100 is connected to a collection server 205, a display monitor 215, and a personal server 225 via a wireless network 250. The network environment 250 is said to be a dynamic network because the devices may dynamically connect to and leave the wireless network 250 based on, for example, the proximity to the network and/or the other devices.

Figure 3:
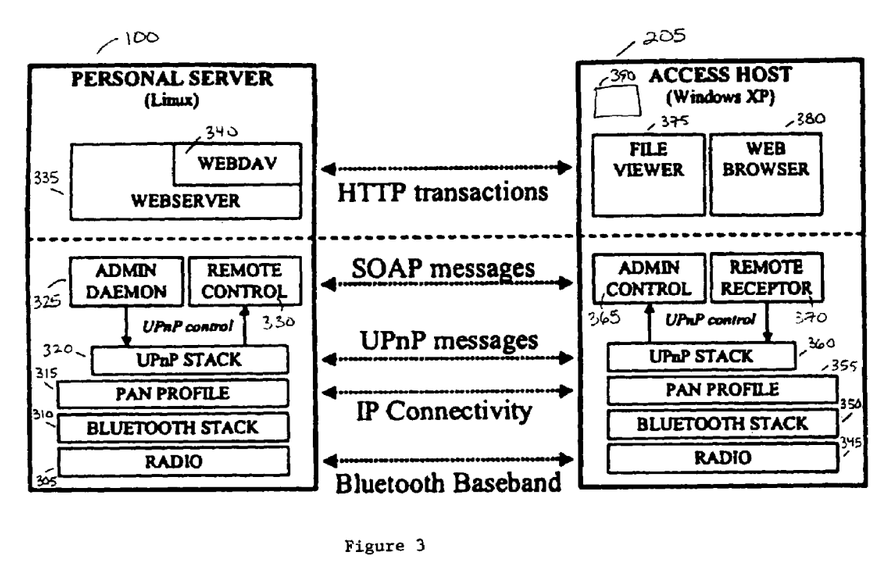
FIG. 3 illustrates one embodiment of the supporting communication software subsystems of the personal server and the collection server.

FIG. 3 illustrates one embodiment of the supporting communication software subsystems of the personal server 100 and the collection server 205. The personal server 100 includes, but is not limited to a radio module 305, a Bluetooth Stack 310, a Personal Area Network (PAN) profile 315, a well-known Universal Plug and Play (UPNP) stack 320, an Admin Daemon 325, a remote control module 330, a web-server module 335, and a webdav module 340. The functions performed by these modules in connection with the present invention will be described in more detail below.

The collection server 205 includes but is not limited to a radio module 345, a Bluetooth Stack 350, a PAN profile 355, a UPnP stack 360, an Admin Control 365, a remote receptor module 370, a file viewer module 375, a web browser module 380, and a collection agent module 390.

In one embodiment, the software on the personal server 100 responds to discovery requests, as per the conventional Bluetooth standard, and supports basic web-services, using an on-board well-known Apache web-server 335, plus administrative and remote control functionality through a custom daemon (325, 330). In one embodiment, the collection server 205 is implemented using a standard Windows XP system from Microsoft Corporation of Redmond Wash., augmented with a Bluetooth stack 350 and custom middleware components. The collection server 205 (via a collection agent module 390 as will be described) is responsible for discovering devices (e.g., the personal server 100) and providing common access protocols. Once an IP connection is established, the various software components shown in FIG. 3 may be activated. Ideally, this common access layer would be present on all systems, allowing access to the personal server 100 from any computing device running the collection agent module 390.

Once a networking connection is established, the personal server 100 supports three capabilities through the UPnP infrastructure: 1) web services, which provide access to the WebDAV file share module 340 and the web server module 335; 2) the remote control module 330, which provides a mechanism to send user interface events from the personal server 100 to the collection server 205; and 3) the administrative daemon 325, which enables access to sharing setup, password control, and basic device information such as memory or battery usage.

On the collection server 205, there are three corresponding services that handle interaction with the personal server 100: 1) the standard web browser module 380 and the file viewer module 375; 2) the remote receptor module 370, which takes commands from the personal server 100 and pushes them to applications through the Microsoft Windows input queue; and 3) the administrative control 365, which provides access to the administrative and information capabilities of the collection server 205.

Communication between the personal server 100 and the collection server 205 host is based upon web protocols such as Universal Plug-and-Play (UPnP), Simple Object Access Protocol (SOAP), and Hypertext Transfer Protocol (HTTP), which are layered on top of the IP networking enabled by the PAN profiles 315 and 355. Basic UPnP setup is accomplished by the UPnP "device" (i.e., "Administrative Daemon 325" and "Remote Receptor Module 370") broadcasting a service description which is picked up by the respective UPNP "control point" (i.e., "Admin Control 365" and "Remote Control Module 330"). SOAP may be used to directly communicate between these entities. Along with WebDAV module 340 and web server access, it also uses the standard HTTP protocol.

Figure 4:
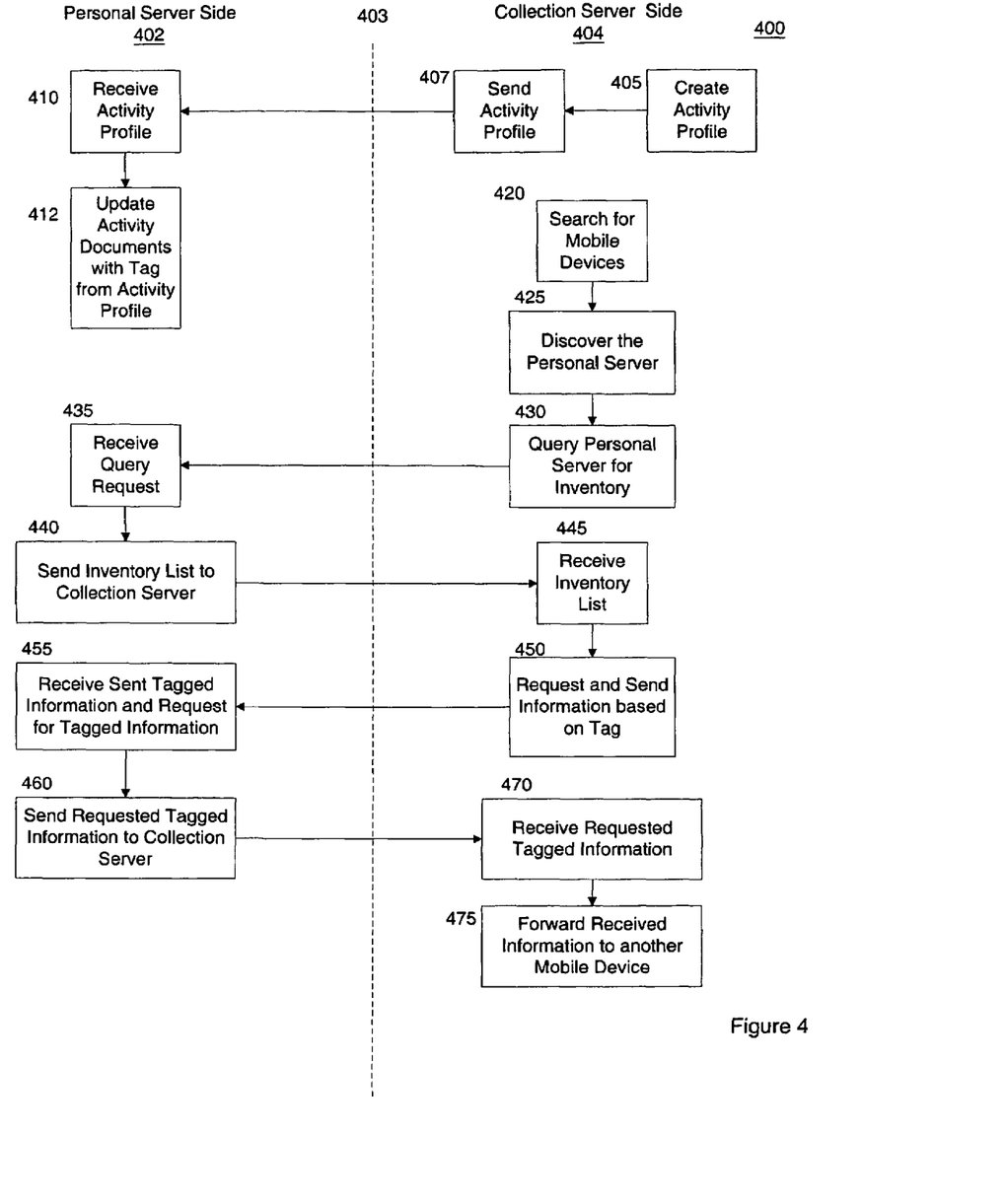
FIG. 4 illustrates one embodiment of a process flow for exchanging information between the personal server and the collection server automatically without human intervention via the network.

In one embodiment, the collection agent module 390 coordinates with the other subsystems of the collection server 205 to seek and transfer information from and to one or more personal servers automatically without human intervention. FIG. 4 illustrates one embodiment of a process flow 400 for exchanging information between the personal server 100 and the collection server 205 automatically without human intervention. Line 403 separates the processing of the personal server side 402 and the collection server side 404. Also, the following description will describe a practical example of using the process flow 400 to exchange conference material (e.g., a conference agenda, schedule, presentations, etc) between conference attendees although the invention is not limited to this example.

At block 405, a user creates an activity profile of an activity (e.g., an event) to be stored on the collection server 205. The activity profile may describe details of the activity including the sponsor of the activity, a description of the activity, a date/time of the activity, a schedule of the activity, a location of the activity, a list of attendees, etc. depending on the type of activity. In addition, an identifier (e.g., tag) is also associated with the activity and stored in the activity profile. A user using a scheduling software tool well known to those of ordinary skill in the art might generate the activity profile including the tag. Alternatively, the activity profile for the activity might be generated automatically based on keywords or other well-known techniques in document classification. However, it is understood that the scheduling tool need not be on the collection server 205. In addition, it is understood that the collection server 205 may also include additional activity profiles of other activities each identified with its own tag.

In the conference example, a conference organizer generates an activity profile including a description of a conference, the date/time of the conference, the location of the conference, the conference schedule, and a conference identifier (ID) tag. The conference organizers might also tag conference material with the conference ID that is stored in the collection server 205. The conference organizer might intend to distribute this conference material as the conference attendees (e.g., speakers, moderators, and spectators) enter the conference facility and connect with the collection server 205, as will be further described below.

At block 407, the collection server 205 sends the activity profile to the personal server 100. The activity profile might be sent directly to the personal server 100 or indirectly (e.g., the activity profile might be sent to the personal server 100 by way of the user's personal computer). Various utilities well-known to those of ordinary skill in the art might be used to send the activity profile to the personal server 100 including electronic mail, file transfer protocol (ftp), hand delivery, shared file system and databases, wireless communications, among other examples. Continuing the conference example, the conference organizer sends the activity profile (including the conference ID) to attendees of the conference. In this fashion, the conference attendees are informed of the conference.

At block 410, the personal server 100 receives and stores the activity profile.

At block 412, the user of the personal server 100 updates documents related to the activity with the tag associated with the received activity profile. Continuing the conference example, the user of the personal server 100 may be a scheduled speaker at the conference that updates his or her conference documents (e.g., a slide show presentation, hand-outs, etc) with the conference ID received in the activity profile.

In this fashion, both the personal server 100 and the collection server 205 include related tagged documents that may be exchanged automatically at the conference upon connecting to the wireless network 250, as will be further explained below. It should also be appreciated that the documents might include metadata such as policy rules. The policy rules are used to restrict who may receive, copy, modify, print, perform, and redistribute the information, among other document control features that is well known in the art. Continuing the conference example, the user of the personal server 100 (e.g., conference presenter) may associate policy rules to restrict only specific attendees to receive a read-only copy of the slide-show presentation. It is understood that the user of the collection server 205 might also restrict its information in a similar manner.

It is also understood that the personal server 100 may also include additional information not related to the conference, which is tagged with another identifier and/or metadata. In this fashion, the information is categorized as one logical collection of information, which may be accessible specifically by the tag or inventoried, as will be shown.

At block 420, the collection agent module 390 on the collection server 205 facilitates the search for mobile devices to connect. In one embodiment, a discovery monitor runs on the collection server 205 and periodically searches for devices within range to connect. Continuing the conference example, the collection agent module 390 is instantiated with the appropriate conference ID and the collection agent module 390 will constantly be on the lookout for mobile devices to connect to.

At block 425, the collection agent module 390 discovers the personal server 100 and initiates a wireless network connection (on the wireless network 250). At block 430, the collection agent module 390 queries the personal server 100 for an inventory of the tagged information. Continuing the conference example, upon discovering the personal server 100, the collection agent module 390 queries the personal server 100 to determine whether there is any information pertaining to the conference (as indicated by the associated conference ID).

It should be noted that it is not necessary for the collection agent module 390 to request and receive the inventory list before requesting specific information. Rather, in an alternative embodiment, the collection agent module 390 may request specific tagged information automatically from the personal server 100 or facilitate the transmission of specific tagged information immediately to the personal server 100, upon discovering the personal server 100.

At block 435, the personal server 100 receives the query request. At block 440, the personal server 100 automatically sends a list of the information, stored on the personal server 100, to the collection server 205 in response to the query request from the collection agent module 390 without intervention by the user. Continuing the conference example, the personal server 100 may send the collection server 205 a list of all available conference-related information on the personal server 100.

At block 445, the collection agent module 390 receives the inventory list of information stored on the personal server 100. The collection agent module 390 may automatically scan the received inventory of available information to identify and/or filter information of interest. At block 450, the collection agent module 390 requests specific information from the personal server 100 that is associated with the tag in the activity profile. Continuing the conference example, the collection agent module 390 may request all information associated with the corresponding conference ID. Also, at block 450, the collection agent module 390 might send the tagged information, related to the activity profile, which is stored in the collection server 205 to the personal server 100. Continuing the conference example, a conference schedule and slideshows of other presentations tagged with the conference ID that is stored on the collection server 205 is automatically sent to the personal server 100 without human intervention upon connecting to the wireless network 250.

At block 455, the personal server 100 receives the request for specific information based on the specific tag, in addition to tagged information from the collection server 205. At block 460, the personal server 100 automatically sends the requested information to the collection server 205 without intervention by the user. Continuing the conference example, the slide-show presentation stored on the personal server 100 and tagged with the related conference ID is sent to the collection server 205.

At block 470, the collection agent module 390 receives the requested information, categorizes the information, and stores the information. Continuing the conference example, the collection agent module 390 may store the received slide show presentation in a specific file directory on the collection server 205 based on, for example, who is giving the presentation, the presentation location (e.g., by conference room), the date/time of the presentation, etc.

At block 475, the collection agent module 390 automatically forwards the received specific information to other personal servers without human intervention. Continuing the conference example, the collection agent module 390 forwards an electronic copy of the slide-show presentation to each of the attendees of the conference or possibly only those attendees registered to attend the specific slide show presentation. In this way, by the time the attendees assemble for the conference, the collection agent module 390 would have already categorized, transmitted, and stored the various conference information for use by the conference attendees.

It should be appreciated that the invented process is more efficient than fetching the information "as needed" from the mobile devices because it mitigates any transmission delays due to a slow wireless network channel. Furthermore, the information would be presented as one logical conference data set, instead of presenting it (to the user) as a disparate collection of information from various mobile devices. There is no need for any human intervention during the information exchange, and nobody needs to be assigned the task of mailing material to the participants; it can all be handled by the collection agent module 390 as soon as the information becomes available to it from the various personal servers.

Alternatively, instead of a specific conference ID tag associated with information targeted at a specific collection agent module 390, the data store on the personal server 100 could be tagged and queried by more generalized meta-data that might apply under varying circumstances, possibly supplied by other mobile devices. For example, a finance representative may configure the personal server 100 to broadcast a request for "All Budget Plans." The personal server 100 could deliver this generic request to the associated collection agent module 390 on the collection server 205 when the personal server 100 comes in contact with a specific meeting space. If somebody else (e.g., personal server 225) connects to the meeting space publishing a document tagged with "Project Budget Plan," the collection agent module 390 would automatically transfer the information from the personal server 225 to the collection server 205 and/or directly to the personal server 100. In this example, the information transferred is not specifically for a scheduled meeting, but instead is proactively transferred based on a dynamic association to optimize the automatic collection and exchange of information.

In another practical usage example of the present invention, an attendee may store an electronic calling card (e-card) on their personal server 100. Upon connecting to the wireless network 250, the collection agent module 390 would automatically receive the e-card, categorize the conference participants based on various criteria, expressed by the metadata associated with the e-card and automatically provide the e-card to other members of the conference, all in a dynamic manner. Yet another practical use could be technicians collecting field data on the personal server 100 that is automatically transferred to a central data store on the collection server 205 or forwarded to a remote data store as soon as each technician arrives at the office and within range of the collection agent module 390 on the collection server 205.

It should be noted that the user of the personal server 100 might add or modify a tag on a document before or after the document is stored on the personal server 100. For example, the user might add or modify a tag on a document at a personal computer, then transmit the tagged document (via wire or wireless communications) to the personal server 100. Alternatively, the user might add or modify a tag on a document stored on the personal server 100 interactivity via interfaces found in a local environment. For example, the personal server 100 may wirelessly utilize a display monitor 215, a keyboard, a public kiosk, and/or any other well-known input/output (IO) device found nearby to add or modify a tag on a document. By co-opting large screens such as those found on desktop personal computers, public display monitors, information kiosks, and other computers, each running the collection agent module 390, the user may view and modify information on the personal server 100 from anywhere. The result is that the user of the personal device 100 may enjoy the benefits of a large display and full-sized keyboard without having to carry a bulky computing platform. Further, the power consumption of the (non-existent) LCD display is not an issue with the personal server device 100, and so the processing and communication subsystems have a greater impact on the overall device battery lifetime. Similarly, this system would enable a seamless transition between a user's home and office setup without having to explicitly manage files and connections between the two.

Thus, an automatic exchange of information in an ad-hoc network environment has been described. Such a system allows for rich interaction, seamless interaction, and information availability. Seamless interaction is enabled by wireless technologies, allowing information access without an explicit human interaction such as a connection step.

It will be appreciated that more or fewer processes may be incorporated into the method(s) and examples illustrated in FIG. 4 without departing from the scope of the invention and that no particular order is implied by the arrangement of blocks shown and described herein. It further will be appreciated that the method(s) and examples described in conjunction with FIG. 4 may be embodied in machine-executable instructions (e.g. software). The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-assessable medium having stored thereon instructions that may be used to program a computer (or other electronic devices) to perform the methods. Thus, a machine-accessible medium includes any mechanism that provides information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), etc. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

While the invention has been described in terms of several embodiments, those skilled in the art will recognize that the invention is not limited to the embodiments described. The method and apparatus of the invention can be practiced with modification and alteration within the scope of the appended claims. The description is thus to be regarded as illustrative instead of limiting on the invention.

What is claimed is:

1. A computer implemented method executed by a processor for automatic data exchange, the method comprising: sending by a server device an activity profile to a plurality of mobile server devices, wherein the activity profile to includes an identifier associated with a first user document; searching by the server device for a first mobile device; querying by the server device, upon discovery that the first mobile device is connected to the server device via a wireless network, for the first user document stored on the first mobile device based on an inventory of available documents stored on the first mobile device, the first user document having an association with a previously scheduled activity and an activity profile based on the identifier, wherein the activity profile includes one or more details of an activity to utilize the first user document; and receiving by the server device the first user document without human intervention; requesting by the server device information from the first mobile device based on the identifier associated with the activity profile; utilizing by the server device the first user document in the previously scheduled activity profile; and transmitting by the server device the first user document to a second mobile device via the wireless network without human interaction before the previously scheduled activity.

2. The computerized method of claim 1, wherein the first user document includes metadata associated with the first user document, the querying being based upon the metadata.

3. The computerized method of claim 1 further comprising:
    sending a second user document to the first device automatically upon receiving the indication the first device has connected to the wireless network.

4. The computerized method of claim 1, further comprising:
    receiving policy rules associated with the first user document; and
    processing the first user document based on the received policy rules.

5. The computerized method of claim 1, wherein the querying includes requesting an inventory list from the first device.

6. The computerized method of claim 5, further comprising searching the inventory list for a document of interest based on metadata associated with the first user document.

7. A machine-accessible storage medium having instructions executed by a machine to perform operations for automatic data exchange comprising: sending by a server device an activity profile to a plurality of mobile server devices, wherein the activity profile to includes an identifier associated with a first user document; searching by the server device for a first mobile device; querying by the server device, upon discovery that the first mobile device is connected to the server device via a wireless network, for the first user document stored on the first mobile device based on an inventory of available documents stored on the first mobile device, the first user document having an association with a previously scheduled activity and an activity profile based on the identifier, wherein the activity profile includes one or more details of an activity to utilize the first user document; and receiving by the server device the first user document without human intervention; requesting by the server device information from the first mobile device based on the identifier associated with the activity profile; utilizing by the server device the first user document in the previously scheduled activity profile; and transmitting by the server device the first user document to a second mobile device via the wireless network without human interaction before the previously scheduled activity.

8. The machine-accessible medium of claim 7, wherein the first user document includes metadata associated with the first user document, the querying being based upon the metadata.

9. The machine-accessible medium of claim 7 further comprising:
sending a second user document to the first device automatically upon receiving the indication the first device has connected to the wireless network.

10. The machine-accessible medium of claim 7, further comprising:
receiving policy rules associated with the first user document; and
processing the first user document based on the received policy rules.

11. The machine-accessible medium of claim 7, wherein the querying includes requesting an inventory list from the first device.

12. The machine-accessible medium of claim 11, further comprising searching the inventory list for a document of interest based on metadata associated with the first user document.

* * * * *